US012368983B2

(12) United States Patent
Xi et al.

(10) Patent No.: US 12,368,983 B2
(45) Date of Patent: Jul. 22, 2025

(54) READOUT CIRCUIT OF SINGLE PHOTON AVALANCHE FOCAL PLANE

(71) Applicant: CHINA ELECTRONICS TECHNOLOGY GROUP CORPORATION NO 44 RESEARCH INSTITUTE, Chongqing (CN)

(72) Inventors: Shuiqing Xi, Chongqing (CN); Ruoyao Gao, Chongqing (CN); Dajian Cui, Chongqing (CN); Junxiang Yuan, Chongqing (CN)

(73) Assignee: CHINA ELECTRONICS TECHNOLOGY GROUP CORPORATION NO 44 RESEARCH INSTITUTE, Chongqing (CN)

(*) Notice: Subject to any disclaimer, the term of this patent is extended or adjusted under 35 U.S.C. 154(b) by 166 days.

(21) Appl. No.: 18/353,890

(22) Filed: Jul. 18, 2023

(65) Prior Publication Data
US 2024/0179437 A1 May 30, 2024

(30) Foreign Application Priority Data
Nov. 28, 2022 (CN) .......................... 202211499605.0

(51) Int. Cl.
H04N 25/78 (2023.01)
H04N 23/667 (2023.01)
H04N 25/773 (2023.01)

(52) U.S. Cl.
CPC .......... *H04N 25/78* (2023.01); *H04N 23/667* (2023.01); *H04N 25/773* (2023.01)

(58) Field of Classification Search
None
See application file for complete search history.

(56) References Cited

U.S. PATENT DOCUMENTS

| 2020/0084396 A1* | 3/2020 | Kuroda | H10F 77/959 |
| 2020/0284883 A1* | 9/2020 | Ferreira | G01S 7/4815 |
| 2021/0223098 A1* | 7/2021 | Ledvina | G01J 1/44 |
| 2021/0352234 A1* | 11/2021 | Padmanabhan | H04N 25/78 |
| 2022/0182532 A1* | 6/2022 | Fairfield | H04N 23/76 |
| 2022/0353440 A1* | 11/2022 | Sonoda | H04N 25/78 |

* cited by examiner

Primary Examiner — Mark T Monk

(57) ABSTRACT

A readout circuit of a single photon avalanche focal plane includes a pixel array circuit, a serial bus circuit, a clock and timing control circuit, a working mode control circuit, a clock generation circuit, temperature sensing circuits, data processing and storage circuits, I/O driving circuits, and a uniformity correction circuit. The pixel array circuit includes pixel unit circuits arranged in an array. The uniformity correction circuit is configured to improve imaging uniformity by performing regional offset adjustment on the pixel array circuit. By adjusting pixels in abnormal areas or a global bias voltage through uniformity correction, a scale of an array of the pixel array circuit is improved, and an SPAD array chip is protected from strong light, so that the readout circuit well meets application scenarios with complex environmental information, high spatial resolution ratio and high imaging frame rate.

9 Claims, 6 Drawing Sheets

READOUT CIRCUIT OF SINGLE PHOTON AVALANCHE FOCAL PLANE

TECHNICAL FIELD

The present disclosure relates to a technical field of photodetectors, and in particular to a readout circuit of a single photon avalanche focal plane that is multifunctional and reconfigurable.

BACKGROUND

A photoelectric focal plane of a photodetector generally comprises a photosensitive array, a readout circuit, and an optical array chip. A photosensitive array of a conventional photoelectric focal plane adopts a "PIN" structure photodiode without gain, and a readout circuit chip of the conventional photoelectric focal plane adopts a low-speed analog amplifier pixel array structure, and the conventional photoelectric focal plane generally does not need the optical array chip. A single photon avalanche focal plane is a new type of "avalanche photodiode (APD)" photoelectric focal plane that is emerged with development of quantum technology in recent years. A photosensitive array thereof adopts a single photon avalanche diode array working in a "Geiger mode", which has sensitivity of "single photon" compared with the photosensitive array working in a "linear mode", also known as a single photon avalanche diode array. A readout circuit chip of the single photon avalanche focal plane adopts a pixel digitizing array with timing or counting functions, and an optical array chip of the single photon avalanche focal plane adopts an optical chip with optical focusing functions such as a microlens or a metasurface. The single photon avalanche focal plane has near-single photon sensitivity, has a time quantization function, and has characteristics of all-solid-state and high frame rate. Therefore, the single photon avalanche focal plane has important application prospects in fields of lidar, fluorescence imaging, terrain mapping, high-speed target tracking, and ultra-long-distance target 3D information detection.

In actual use, in addition to limitations of the optical array chip and the readout circuit of the single photon avalanche focal plane, following technical problems limit an application of the single photon avalanche focal plane:

In terms of uniformity of photon detection, existing materials and process deviations lead to reduction of the uniformity of the photon detection by a photosensitive chip. With an expansion of the photosensitive array, the uniformity of the photon detection further deteriorate, which affects quality of imaging, thus limiting the maximum size of the photosensitive array of the single photon avalanche focal plane.

In terms of optical dynamics and reliability, in actual use, incident light of the optical array chip of the single photon avalanche focal plane changes by 2 to 5 orders of magnitude due to distance changes caused by detection targets from far to near, a reflection coefficient of different detection targets, and other interfering light. Strong light makes a temperature of the optical array chip to rise, causing losing lock in the temperature of the optical array chip and causing performance degradation. Furthermore, the strong light leads to a sharp rise in the temperature of the optical array chip and permanent changes in performance parameters, and the strong light even destructively breakdowns the optical array chip.

In terms of background light interference, sunlight and interfering light cause a large number of false triggers in actual use of the single photon avalanche focal plane. The single photon avalanche focal plane adopts a conventional single-echo readout circuit, which significantly reduces a signal-to-noise ratio and affects a detection distance and a spatial resolution ratio of the single photon avalanche focal plane.

SUMMARY

In view of deficiencies in the prior art, a technical problem to be solved by the present disclosure is to provide a readout circuit of a single photon avalanche focal plane that is multifunctional and reconfigurable.

To achieve the above object, the present disclosure provides the readout circuit of the single photon avalanche focal plane. The readout circuit comprises a pixel array circuit, a serial bus circuit, a clock and timing control circuit, a working mode control circuit, a clock generation circuit, temperature sensing circuits, data processing and storage circuits, I/O driving circuits, and a uniformity correction circuit. The pixel array circuit comprises pixel unit circuits arranged in an array. The uniformity correction circuit is configured to improve imaging uniformity by performing regional offset adjustment on the pixel array circuit.

In the present disclosure, by performing regional offset adjustment, the imaging uniformity is improved. By uniformity correction of bias voltage of 0-5V, a root mean square ratio of photon detection efficiency is increased by 30%, and a strong light threshold is increased to millions of photons per pulse per pixel. Low bias linear imaging increases a saturation threshold of pixel imaging from hundreds of photons to tens of thousands of photons. A specific working mode of an SPAD array chip is determined by data feature detection and temperature detection. By adjusting a pixel of abnormal areas or a bias voltage of the global area, a size of an array of the single photon avalanche focal plane is improved, and the SPAD array chip is protected from strong light. By single-echo timing, multi-echo timing, and photon counting, the single photon avalanche focal plane is reconfigured to realize signal detection under a background light interference environment, and a variety of imaging modes is realized.

A two-dimensional and three-dimensional hybrid imaging mode improves environmental adaptability of the present disclosure, and an interest detection imaging mode only images local area according to requirements, which solves the performance and reliability problems in the actual use of components of the single photon avalanche focal plane, and well meets application scenarios with complex environmental information, high spatial resolution ratio and high imaging frame rate.

DETAILED DESCRIPTION

Figure 1:
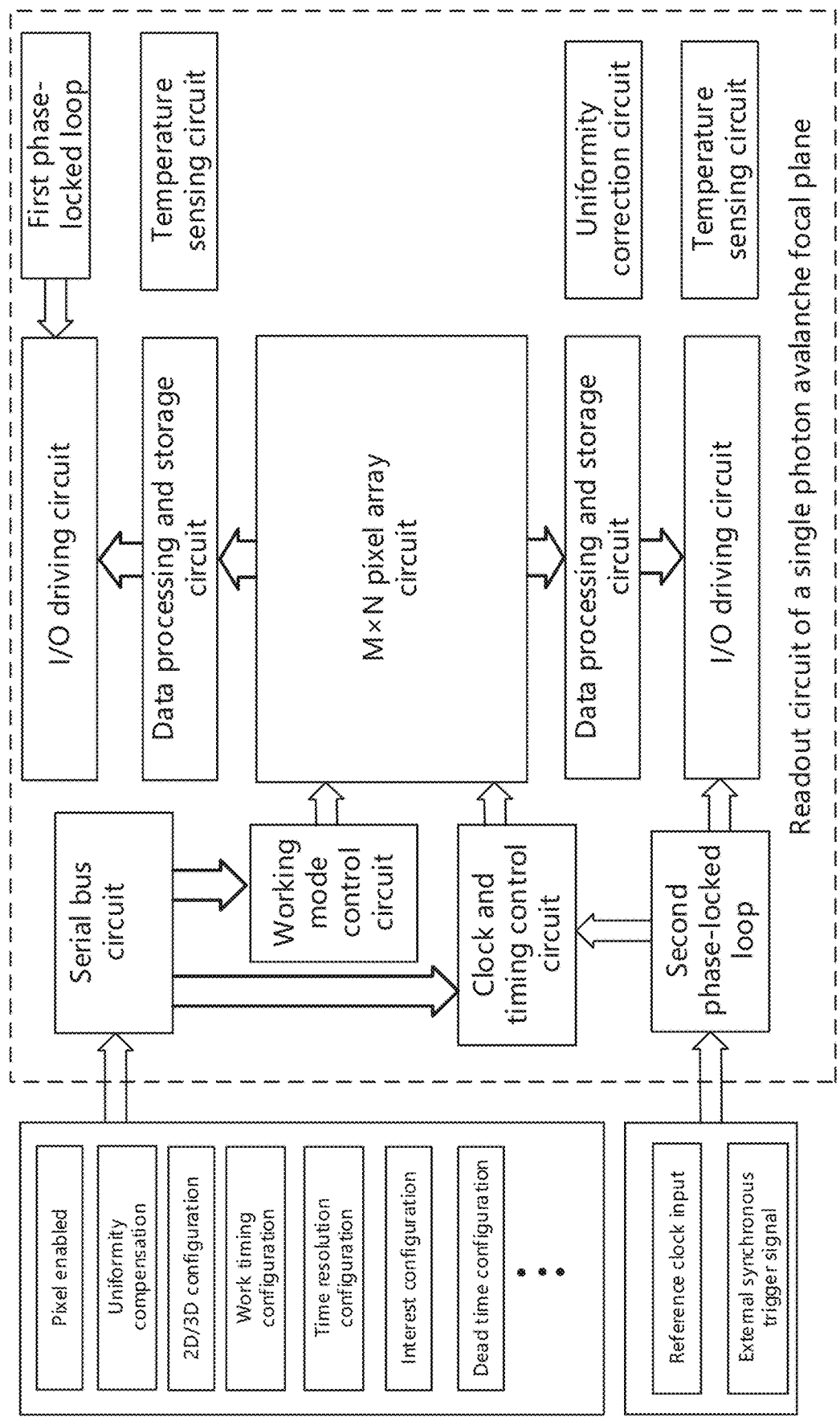
FIG. 1 is a structural schematic diagram of a readout circuit of a single photon avalanche focal plane according to one optional embodiment of the present disclosure.

As shown in FIG. 1, in one optional embodiment, a readout circuit of a single photon avalanche focal plane of the present disclosure that is multifunctional and configurable is provided. The readout circuit comprises a pixel array circuit (in the embodiment, an M×N pixel array circuit is taken as an example for illustration), a serial bus circuit, a clock and timing control circuit, a working mode control circuit, a clock generation circuit, temperature sensing circuits, data processing and storage circuits, I/O driving circuits, and a uniformity correction circuit. The pixel array circuit comprises pixel unit circuits arranged in an array. The pixel unit circuits are one-to-one electrically connected to photosensitive elements, thereby providing a bias voltage for each of the photosensitive elements. The clock generation circuit comprises a first phase-locked loop and a second phase-locked loop. The first phase-locked loop and the second phase-locked loop are respectively configured to provide readout clocks for the two I/O driving circuits. The second phase-locked loop is further configured to provide clocks for the clock and timing control circuit and the pixel unit circuits.

The uniformity correction circuit is configured to improve imaging uniformity by performing regional offset adjustment on the pixel array circuit. In order to facilitate the regional bias adjustment of the pixel array circuit, the M×N pixel array circuit is divided into sub-array pixel circuits with smaller array specifications. Each of the sub-array pixel circuits comprises the pixel unit circuits. Each of the sub-array pixel circuits generally adopts a square array with an array specifications of 2×2, 4×4, 8×8, or 32×32, or each of the sub-array pixel circuits generally adopts a rectangular array with an array specification of 2×4, 4×8, or 4×32.

Figure 2:
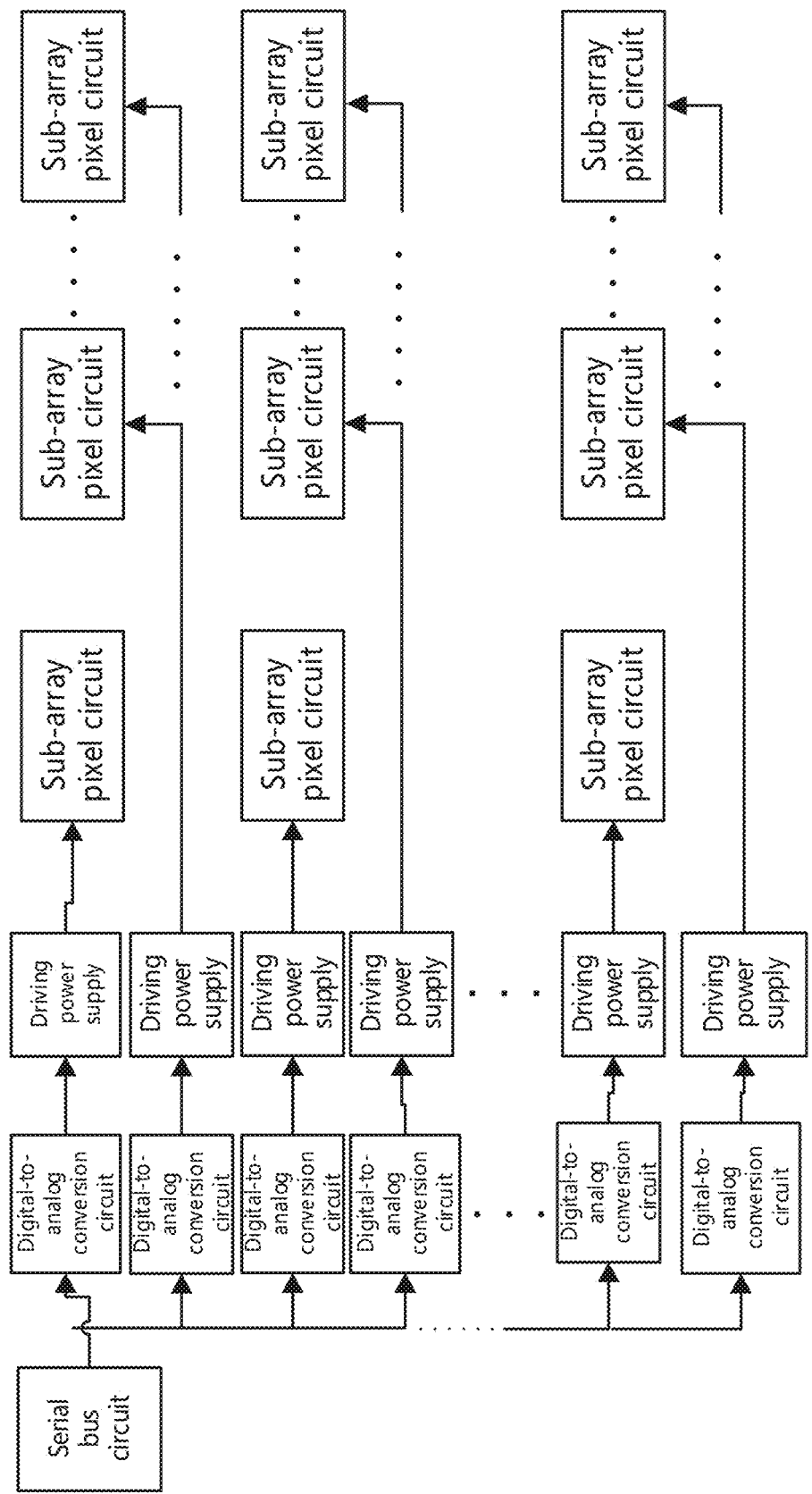
FIG. 2 is a structural schematic diagram of a uniformity correction circuit.

As shown in FIG. 2, the uniformity correction circuit comprises digital-to-analog conversion circuits. The digital-to-analog conversion circuits are electrically connected to the serial bus circuit. The digital-to-analog conversion circuits are one-to-one corresponding to the sub-array pixel circuits. Each of the digital-to-analog conversion circuits is electrically connected to a driving power supply. Each driving power supply is configured to provide a uniformity correction voltage for a corresponding sub-array pixel circuit of the sub-array pixel circuits. An adjustment range of each uniformity correction voltage is generally 0-5V.

The uniformity correction circuit has functions of local strong light protection and global strong light protection, and working modes of the readout circuit comprises a Geiger imaging mode, a low bias linear imaging mode, and a Geiger and linear hybrid imaging mode.

When a proportion of the sub-array pixel circuits illuminated by strong light (that is, a ratio of a quantity of the sub-array pixel circuits illuminated by the strong light to a total number of the sub-array pixel circuits) is less than a first strong light proportion threshold P, the uniformity correction circuit do not perform the local strong light protection or the global strong light protection, and the readout circuit works in the Geiger imaging mode, so that the photosensitive elements respectively connected with the pixel unit circuits work in a Geiger mode. The first strong light proportion threshold is greater than 0% and no more than 20%.

When the proportion of the sub-array pixel circuits illuminated by the strong light exceeds a second strong light proportion threshold Q, the readout circuit is switched to the low bias linear imaging mode, and the uniformity correction circuit performs the global strong light protection, so that a bias voltage of the pixel array circuit is reduced, the photosensitive elements respectively connected with the pixel unit circuits work in a linear mode. The second strong light proportion threshold Q is greater than the first strong light proportion threshold P. The second strong light proportion threshold Q is greater than 20% and no more than 50%.

When the proportion of the sub-array pixel circuits illuminated by the strong light is grater than the first strong light proportion threshold P (e.g., 20%) and less than the second strong light proportion threshold Q (e.g., 50%) the readout circuit is switched to the Geiger and linear hybrid imaging mode, the uniformity correction circuit performs the local strong light protection. At this time, the sub-array pixel circuits are divided into first sub-array pixel circuits and second sub-array pixel circuits. The first sub-array pixel circuits are irradiated by the strong light and the second sub-array pixel circuits are not irradiated by the strong light, so that the photosensitive elements connected to the pixel unit circuits of the first sub-array pixel circuits work in the linear mode, and the photosensitive elements connected to the pixel unit circuits of the second sub-array pixel circuits work in the Geiger mode.

Figure 3:
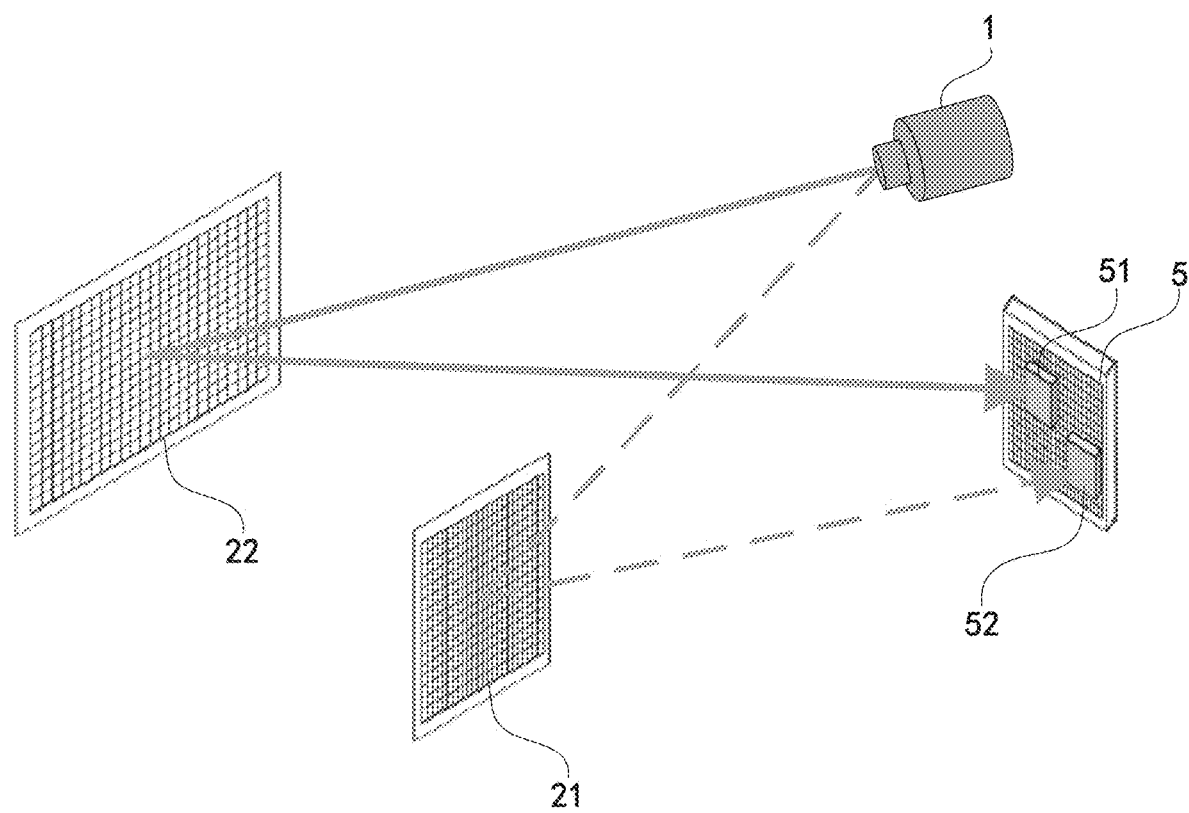
FIG. 3 is a schematic diagram of a Geiger and linear hybrid imaging mode.

As shown in FIG. 3, the Geiger and linear hybrid imaging mode is mainly applied in a case where there is a large dynamic scenario for high reflection targets, low reflection targets, remote targets, and close range targets. At this time, light pulse emitted by a laser source 1 is reflected through a close range and high reflection target 21 to form a strong reflected light signal, and an area irradiated by the strong reflected light signal is a linear imaging area 51. The light pulse emitted by the laser source 1 is reflected through a remote and low reflection target 22 to form a weak reflected light signal. and an area irradiated by the weak reflected light signal is a Geiger imaging area 52. The photosensitive elements in the linear imaging area 51 need to work in the linear mode to receive the strong reflected light signal, and the photosensitive elements in the Geiger imaging area 52 work in the Geiger mode to receive the weak reflected light signal.

Since the readout circuit of the embodiment comprises the Geiger imaging mode, the low bias linear imaging mode, and the Geiger and linear hybrid imaging mode, when the readout circuit works in the Geiger mode, if the strong reflected light signal is suddenly received, the photosensitive elements in local areas or a global area works in the linear mode according to an irradiation range of the strong reflected light signal. When the readout circuit is switched to the low bias linear imaging mode or the Geiger and linear hybrid imaging mode. It is still able to be imaged.

Figure 4:
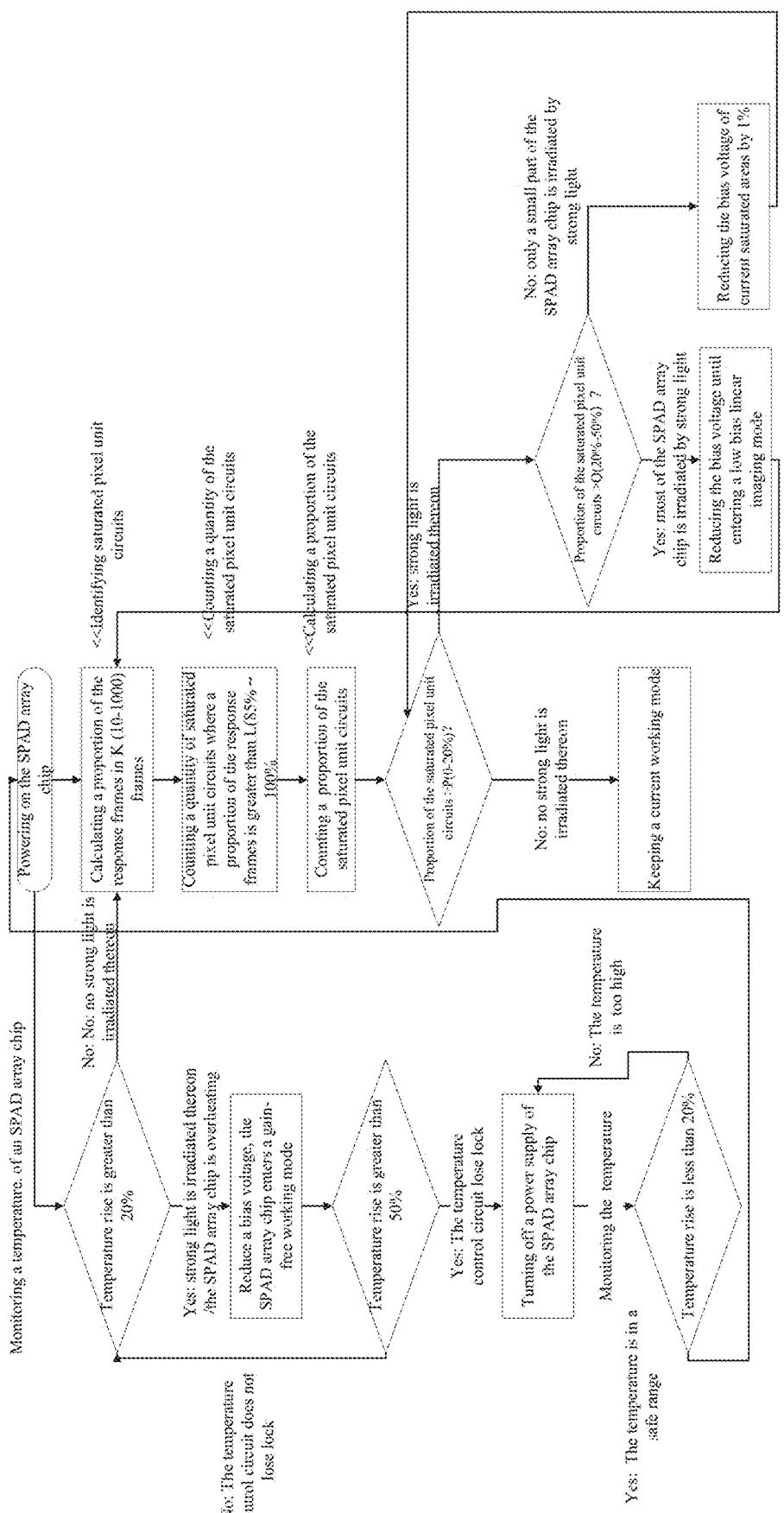
FIG. 4 is a working flowchart of the uniformity correction circuit.

As shown in FIG. 4, both of a workflow for performing the local strong light protection and a workflow for performing the global strong light protection by the uniformity correction circuit comprise following steps:

S201: identifying saturated pixel unit circuits in the pixel unit circuits;

Specifically, a method of identifying the saturated pixel unit circuits in the pixel unit circuits comprises: counting a quantity of response frames of each of the pixel unit circuits in K frames (a value of K is 10-1000 frames); calculating a proportion of the response frames (i.e, a proportion of the response frames to a total frame number of predetermined frames K); and identifying the pixel unit circuits each having the proportion of the response frames greater than a saturation ratio threshold L (a value of the saturation ratio threshold L is 85%-100%) as the saturated pixel unit circuits.

S202: counting a quantity of the saturated pixel unit circuits and calculating a proportion of the saturated pixel unit circuits;

The proportion of the saturated pixel unit circuits is a ratio of the quantity of the saturated pixel unit circuits to a total number of the pixel unit circuits (ie, N×M).

S203: determining whether the proportion of the saturated pixel unit circuits exceeds the first strong light proportion threshold P; determining that strong light irradiation is performed and executing a step S205 for further judgment, if the proportion of the saturated pixel unit circuits exceeds the first strong light proportion threshold P; and determining that none of the photosensitive elements are irradiated by the strong light and executing a step S204, if the proportion of the saturated pixel unit circuits is within the first strong light proportion threshold P;

S204: operating the readout circuit in the Geiger mode (i.e., all of the photosensitive elements connected to the pixel unit circuits of the pixel array circuit work in the Geiger mode) and returning to the step S201;

S205: determining whether the proportion of the saturated pixel unit circuits exceeds the second strong light proportion threshold Q; determining that most of the photosensitive elements are irradiated by the strong light and executing a step S206 if the proportion of the saturated pixel unit circuits exceeds the second strong light proportion threshold Q; determining that a small part of the photosensitive elements are irradiated by the strong light and executing a step S207 if the proportion of the saturated pixel unit circuits is within the second strong light proportion threshold;

S206: switching the readout circuit to the low bias linear imaging mode and performing the global strong light protection by the uniformity correction circuit, so that the bias voltage of the pixel array circuit is reduced and all of the photosensitive elements work in the linear mode; and executing the step S201 again;

S207: switching the readout circuit to the Geiger and linear hybrid imaging mode, and performing the local strong light protection by the uniformity correction circuit, so that a bias voltage of each of the sub-array pixel circuits where the saturated pixel unit circuits are located is reduced by a predetermined ratio (e.g., reduced by 1%), the photosensitive elements connected with the pixel unit circuits work in the linear mode; and a bias voltage of remaining sub-array pixel circuits is unchanged; and executing the step S201 again.

As shown in FIG. 4, the uniformity correction circuit further has a function of strong light damage protection. A workflow of performing the strong light damage protection by the uniformity correction circuit comprises:

S101: powering on a single photon avalanche diode (SPAD) array chip;

At this time, a temperature of the SPAD array chip increases correspondingly according to a working state.

S102: detecting whether a temperature rise proportion of the SPAD array chip exceeds a first temperature rise proportion threshold (e.g., the first temperature rise proportion threshold is 20%); if the temperature rise proportion of the SPAD array chip exceeds the first temperature rise proportion threshold, determining that a temperature of the SPAD array chip is relatively high and executing a step S103; if no, determining that the temperature of the SPAD array chip is within a normal range, executing the step S201 and operating the readout circuit normally;

S103: reducing a bias voltage of the SPAD array chip by the uniformity correction circuit, so that the SPAD array chip enters a gain-free working mode;

Therefore, further increase of the temperature of the SPAD array chip is avoided, and the SPAD is protected.

S104: detecting whether the temperature rise proportion of the SPAD array chip exceeds a second temperature rise proportion threshold (e.g., the second temperature rise proportion threshold is 50%); if the temperature rise proportion of the SPAD array chip exceeds 50%, determining that the strong light is too intense to causes the temperature of the SPAD array chip to be too high, which may damage the SPAD array chip, and executing a step S105; if no, executing the step S102 again to monitor the temperature of the SPAD array chip;

S105: turning off a power supply of the SPAD array chip to avoid damage of the SPAD array chip;

S106: detecting whether the temperature rise proportion of the SPAD array chip is less than 20%; if the temperature rise proportion of the SPAD array chip is less than 20%, determining that the temperature of the SPAD array chip is within the normal range; executing the step S101 again to power on the SPAD array chip.

In order to adapt to different imaging environments, a structure of each of the pixel unit circuits is improved in the embodiment, so that each of the pixel unit circuits has three working states, which are respectively an active three-dimensional timing imaging state, a photon counting two-dimensional imaging state, and a non-imaging state. The photon counting two-dimensional imaging state further comprises an active counting two-dimensional imaging state and a passive counting two-dimensional imaging state. Therefore, the working modes of the readout circuit further comprise an active timing three-dimensional imaging mode, an active counting two-dimensional imaging mode, a passive counting two-dimensional imaging mode, a two-dimensional and three-dimensional hybrid imaging mode, and an interest detection imaging mode.

Active imaging is an imaging method in which the light pulse emitted by the laser source 1 is reflected by an imaging target 2 in a pixel array instantaneous view field 3 to from laser pulse reflected light, and the laser pulse reflected light is received by the single photon avalanche focal plane 5 through a receiving optical system 4. Passive imaging is an imaging method that receives reflected light of natural light or reflected light from non-cooperating artificial light sources by the single photon avalanche focal plane 5.

The active three-dimensional timing imaging state comprises single laser echo photon timing imaging and multiple laser echo photon timing imaging. In the single laser echo photon timing imaging, only one photon event is received in a single imaging frame, that is, at most one echo is received and timed in a single shutter. The multiple laser echo photon timing imaging is to receive photon events in a single imaging frame, that is, two or more echoes are received in a single shutter. A quantity of the received echoes is determined by dead time and a measurement gate width. When the readout circuit is in the active timing three-dimensional imaging mode, all of the pixel unit circuits work in the active three-dimensional timing imaging state. A working process of the active timing three-dimensional imaging mode is as follows: the laser source 1 emits the light pulse and starts timing at the same time, and the single photon avalanche focal plane 5 calculates a round-trip time from emission of the light pulse according to the echo of the imaging target, thereby restoring a target point cloud and realizing active timing three-dimensional imaging.

The active counting two-dimensional imaging state realizes light intensity imaging by measuring a quantity of active laser echo photons within a certain period of time. When the readout circuit is in the active counting two-dimensional imaging mode, all of the pixel unit circuits work in the active counting two-dimensional imaging state. A working process of the active counting two-dimensional imaging mode is as follow: the laser source 1 emits the light pulse, the pixel unit circuits cumulatively counts photon response times of each of the photosensitive elements within the certain period of time, and the pixel unit circuits convert a counting matrix into an echo-number-gray image to realize the active counting two-dimensional imaging.

The passive counting two-dimensional imaging state realizes the light intensity imaging by measuring a quantity of the photon events caused by natural reflected light, illuminated reflected light, etc. within the certain period of time. When the readout circuit is in the passive counting two-dimensional imaging mode, all of the pixel unit circuits work in the passive counting two-dimensional imaging state. A working process of the passive counting two-dimensional imaging mode is as follow: under a condition that only the natural light and the non-cooperating artificial light source are provided, the single photon avalanche focal plane 5 cumulatively counts the photon response times of each of the photosensitive elements within the certain period of time, and the single photon avalanche focal plane 5 converts the counting matrix into the echo-number-gray image to realize the passive counting two-dimensional imaging.

Figure 5:
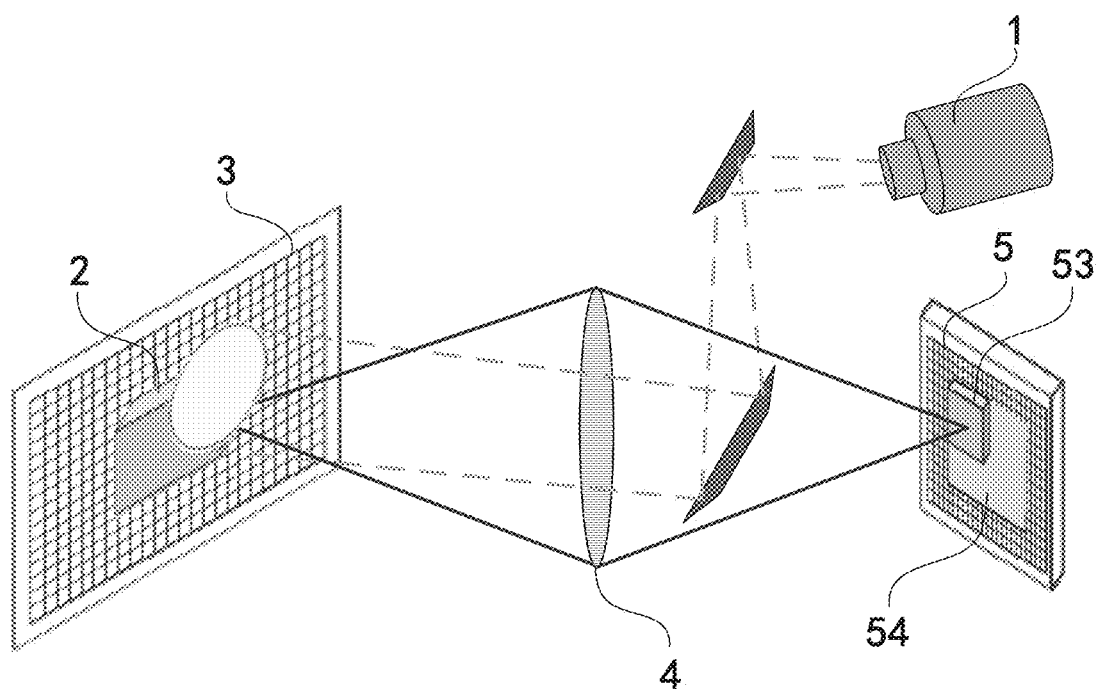
FIG. 5 is a schematic diagram of a two-dimensional and three-dimensional hybrid imaging mode.

As shown in FIG. 5, the two-dimensional and three-dimensional hybrid imaging mode is to divide the single photon avalanche focal plane 5 into a three-dimensional imaging area 53 and a two-dimensional imaging area 54 according to requirements. In a same frame, the pixel unit circuits in the three-dimensional imaging area 53 of the single photon avalanche focal plane 5 work in the active three-dimensional timing imaging state, and the pixel unit circuits in the two-dimensional imaging area 54 of the single photon avalanche focal plane 5 work in the photon counting two-dimensional imaging state. The two-dimensional and three-dimensional hybrid imaging mode is mainly suitable for scenarios with strong background light such as daytime. According to the requirements, some pixel unit circuits work in the active three-dimensional timing imaging state, and the remaining pixel unit circuits work in the photon counting two-dimensional imaging state (that is, in the active counting two-dimensional imaging state or the passive counting two-dimensional imaging state), which effectively reduces power consumption and data volume and is easy for back-end processing.

Figure 6:
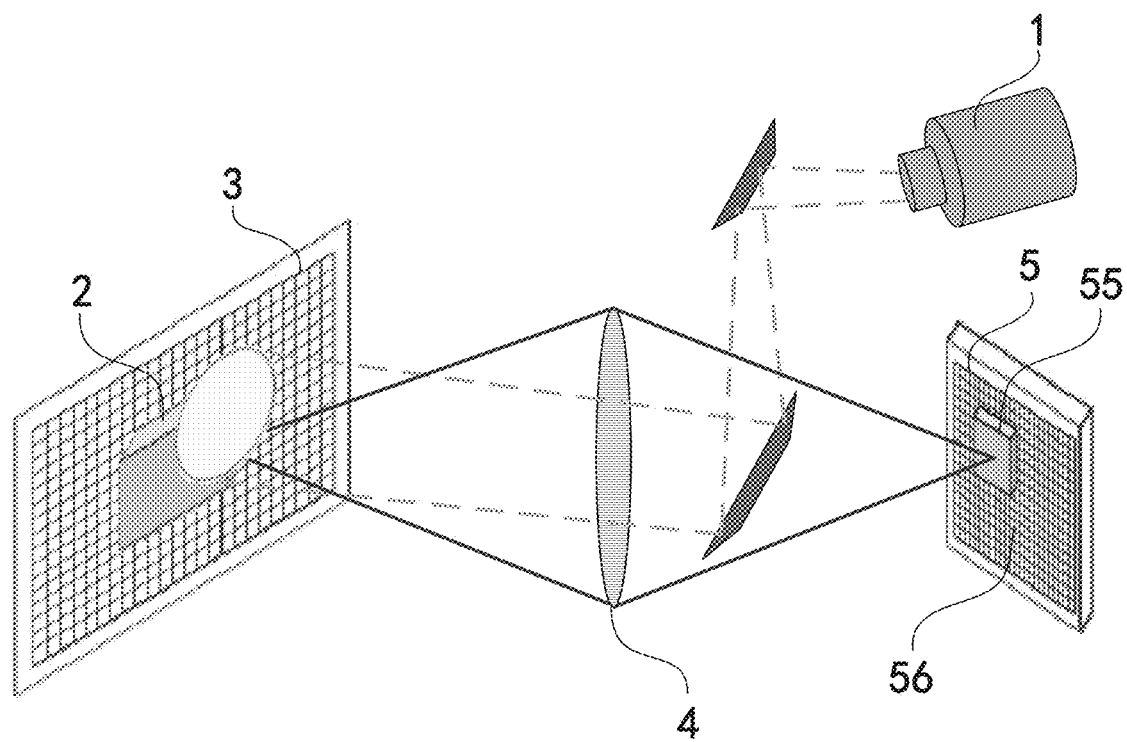
FIG. 6 is a schematic diagram of an interest detection imaging mode/

As shown in FIG. 6, the interest detection imaging mode is to divide the he single photon avalanche focal plane 5 into an interest imaging area 55 and a non-imaging area 56 according to the requirements. The pixel unit circuits in the interest imaging area 55 of the single photon avalanche focal plane 5 work and the pixel unit circuits in the non-imaging area 56 of the single photon avalanche focal plane 5 stop working. In the interest detection imaging mode, only the pixel unit circuits in the interest imaging area 55 that need to work work and participate in imaging, and the pixel unit circuits in the interest imaging area 55 are in the non-working state (that is, the non-imaging state) and no longer respond to the photons, and the pixel unit circuits in the interest imaging area 55 are not readout.

Figure 7:
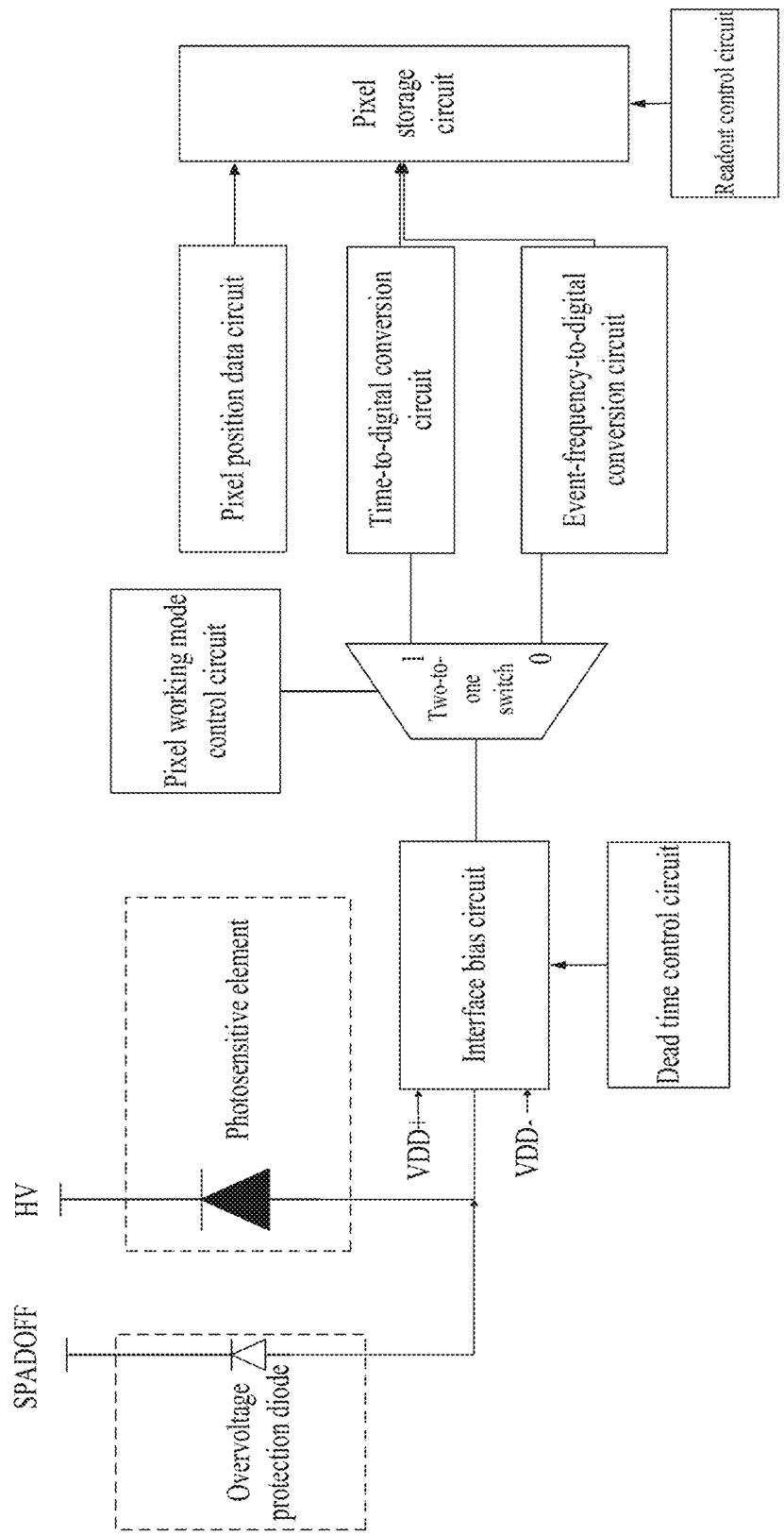
FIG. 7 is a schematic structural diagram of a pixel unit circuit.

As shown in FIG. 7, each of the pixel unit circuits comprises an interface bias circuit, an overvoltage protection diode, a dead time control circuit, a two-to-one switch, a pixel working mode control circuit, a time-to-digital conversion circuit, a event-frequency-to-digital conversion circuit, a pixel position data circuit, a pixel storage circuit, and a readout control circuit.

The dead time control circuit thereof is electrically connected to the interface bias circuit thereof. The interface bias circuit thereof is configured to connect an SPAD thereof (that is, a photosensitive element). The interface bias circuit thereof is electrically connected to the overvoltage protection diode thereof. The interface bias circuit thereof is also electrically connected to an input end of the two-to-one switch thereof. A control end of the two-to-one switch thereof is electrically connected to the pixel working mode control circuit thereof. A first output end of the two-to-one switch thereof is electrically connected to the time-to-digital conversion circuit thereof. A second output end of the two-to-one switch thereof is electrically connected to the event-frequency-to-digital conversion circuit thereof. The time-to-digital conversion circuit thereof and the event-frequency-to-digital conversion circuit thereof are electrically connected to the pixel storage circuit thereof. The pixel storage circuit thereof is respectively It is electrically connected with the pixel position data circuit thereof and the readout control circuit thereof.

The interface bias circuit thereof is configured to provide a bias voltage for the SPAD thereof. The interface bias circuit thereof is connected with a negative supply voltage VDD− thereof and a positive power supply voltage VDD+ thereof. When the SPAD thereof of the single photon avalanche focal plane is negative-positive (NP) type. An N terminal of the SPAD thereof is connected to a power supply voltage HV thereof, and the power supply voltage HV thereof is a positive high voltage. A P terminal of the single photon avalanche diode thereof is electrically connected to the interface bias circuit thereof. Maximum bias voltage of the interface bias circuit thereof is a difference between the positive high voltage HV thereof and the negative power supply voltage VDD− thereof. When the single photon avalanche diode thereof of the single photon avalanche focal plane is negative-positive (PN) type, the P terminal of the SPAD thereof is connected to the power supply voltage HV thereof, and the power supply voltage HV thereof is a negative high voltage. The N terminal of the SPAD thereof is electrically connected to the interface bias circuit thereof. The maximum bias voltage of the interface bias circuit thereof is a difference between the positive power supply voltage VDD+ thereof and the negative high voltage HV thereof. Since the interface bias circuit thereof is connected to the negative power supply voltage VDD− thereof and the positive power supply voltage VDD+ thereof at the same time, an adjustment range of the bias voltage is effectively increased, so that the bias voltage is adjusted within a wide range of 0-5V.

The overvoltage protection diode thereof is configured to limit a maximum voltage at a joint of the SPAD and the interface bias circuit thereof. When the maximum voltage at the joint is greater than a reference voltage SPADOFF, the overvoltage protection diode thereof is turned on, thereby limiting the voltage at the joint from increasing. The dead time control circuit thereof is configured to control a time interval between two photon events received by the interface bias circuit thereof;

The two-to-one switch thereof is configured to connect the interface bias circuit thereof to the time-to-digital conversion circuit thereof or the event-frequency-to-digital conversion circuit thereof.

The pixel working mode control circuit thereof is configured to control the two-to-one switch according to a state of a corresponding pixel unit circuit. When the interface bias circuit thereof is communicated with the time-to-digital conversion circuit thereof, the corresponding pixel unit circuit thereof is in the active three-dimensional timing imaging state. When the interface bias circuit thereof is communicated with the event-frequency-to-digital conversion circuit thereof, the corresponding pixel unit circuit thereof is in the photon counting two-dimensional imaging state. When the interface bias circuit thereof is disconnected from the time-to-digital conversion circuit thereof and the event-frequency-to-digital conversion circuit thereof, the corresponding pixel unit circuit is in the non-imaging state.

The time-to-digital conversion circuit thereof is configured to measure a photon flight time to realize three-dimensional imaging.

The time-to-digital conversion circuit thereof starts timing after receiving a external synchronous trigger signal, and stops timing after an intra-frame gating signal generated by the clock and timing control circuit thereof ends. In an timing interval, the time-to-digital conversion circuit thereof generates a timing data every time it receives a photon signal and stores the timing data in the pixel storage circuit thereof. The timing data is read out after the intra-frame gating signal ends, and the timing data stops being read out after a frame period ends.

The event-frequency-to-digital conversion circuit thereof is configured to count received photon events to realize the two-dimensional imaging, so that the corresponding pixel unit circuit is in the photon counting two-dimensional imaging state. The event-frequency-to-digital conversion circuit thereof starts counting when the intra-frame gating signal starts, stops counting after the intra-frame gating signal ends, and outputs counting data to be stored in the pixel storage circuit thereof. The counting data is read out after the intra-frame gating signal ends, and the counting data stop being read out reading after the frame period ends.

The pixel position data circuit thereof is configured to generate position information of the corresponding pixel unit circuit and output the position information to the pixel storage circuit thereof.

The position information is read out together with the timing data or the counting data after the intra-frame gating signal in the frame period ends. When the corresponding pixel unit circuit fails to receive one photon event signal within a gating time, the pixel position data circuit thereof does not generate the position information, and the corresponding pixel unit circuit does not output any data.

The pixel storage circuit thereof is configured to store information (i.e., the position information, the timing data, and the counting data) output by the time-to-digital conversion circuit thereof, the event-frequency-to-digital conversion circuit thereof, and the pixel position data circuit thereof. The readout control circuit is configured to control readout of the information stored in the pixel storage circuit thereof.

The present disclosure provides the readout circuit for reconstituting the single photon avalanche focal plane. By performing regional offset adjustment, the imaging uniformity is improved. By uniformity correction of the bias voltage of 0-5V, a root mean square ratio of photon detection efficiency is increased by 30%, and a strong light threshold is increased to millions of photons per pulse per pixel. The low bias linear imaging mode increases a saturation threshold of pixel imaging from hundreds of photons to tens of thousands of photons. A specific working mode of the SPAD array chip is determined by data feature detection and temperature detection. By adjusting a pixel of abnormal areas or a bias voltage of the global area, a size of an array of the single photon avalanche focal plane is improved, and the SPAD array chip is protected from the strong light. By single-echo timing, multi-echo timing, and photon counting, the single photon avalanche focal plane is reconstructed to realize signal detection under a background light interference environment. The working modes of the readout circuit comprise the active timing three-dimensional imaging mode, the active counting two-dimensional imaging mode, the passive counting two-dimensional imaging mode, the two-dimensional and three-dimensional hybrid imaging mode, and the interest detection imaging mode.

The two-dimensional and three-dimensional hybrid imaging mode improves environmental adaptability of the present disclosure, and the interest detection imaging mode only image local area according to the requirements, which solves the performance and reliability problems in the actual use of components of the single photon avalanche focal plane, and well meets application scenarios with complex environmental information, high spatial resolution ratio and high imaging frame rate.

What is claimed is:

1. A readout circuit of a single photon avalanche focal plane, comprising: a pixel array circuit, a serial bus circuit, a clock and timing control circuit, a working mode control circuit, a clock generation circuit, temperature sensing circuits, data processing and storage circuits, I/O driving circuits, and a uniformity correction circuit;

wherein the pixel array circuit comprises pixel unit circuits arranged in an array; the uniformity correction circuit is configured to improve imaging uniformity by performing regional offset adjustment on the pixel array circuit;

wherein the pixel array circuit comprises sub-array pixel circuits; each of the sub-array pixel circuits comprises the pixel unit circuits; the uniformity correction circuit comprises digital-to-analog conversion circuits; the digital-to-analog conversion circuits are electrically connected to the serial bus circuit; the digital-to-analog conversion circuits are one-to-one corresponding to the sub-array pixel circuits; each of the digital-to-analog conversion circuits is electrically connected to a driving power supply; each driving power supply is configured to provide a uniformity correction voltage for a corresponding sub-array pixel circuit of the sub-array pixel circuits.

2. The readout circuit of the single photon avalanche focal plane according to claim 1, wherein the uniformity correction circuit has functions of local strong light protection and global strong light protection; working modes of the readout circuit comprises a Geiger imaging mode, a low bias linear imaging mode, and a Geiger and linear hybrid imaging mode;

when the uniformity correction circuit do not perform the local strong light protection or the global strong light protection, the readout circuit works in the Geiger imaging mode, so that photosensitive elements work in a Geiger mode;

when the uniformity correction circuit performs the global strong light protection, the readout circuit is switched to the low bias linear imaging mode, so that the photosensitive elements work in a linear mode;

when the uniformity correction circuit performs the local strong light protection, the readout circuit is switched to the Geiger and linear hybrid imaging mode, the sub-array pixel circuits are divided into first sub-array pixel circuits and second sub-array pixel circuits, so that the photosensitive elements connected to the pixel unit circuits of the first sub-array pixel circuits work in the linear mode, and the photosensitive elements connected to the pixel unit circuits of the second sub-array pixel circuits work in the Geiger mode; the first sub-array pixel circuits are irradiated by strong light and the second sub-array pixel circuits are not irradiated by the strong light.

3. The readout circuit of the single photon avalanche focal plane according to claim 1, wherein both of a workflow for performing the local strong light protection and a workflow for performing the global strong light protection by the uniformity correction circuit comprise:
S201: identifying saturated pixel unit circuits in the pixel unit circuits;
S202: counting a quantity of the saturated pixel unit circuits and calculating a proportion of the saturated pixel unit circuits;
S203: determining whether the proportion of the saturated pixel unit circuits exceeds a first strong light proportion threshold; executing a step S205 if the proportion of the saturated pixel unit circuits exceeds the first strong light proportion threshold; executing a step S204 if the proportion of the saturated pixel unit circuits is within the first strong light proportion threshold;
S204: operating the readout circuit in the Geiger mode and returning to the step S201;
S205: determining whether the proportion of the saturated pixel unit circuits exceeds a second strong light proportion threshold; executing a step S206 if the proportion of the saturated pixel unit circuits exceeds the second strong light proportion threshold; executing a step S207 if the proportion of the saturated pixel unit circuits is within the second strong light proportion threshold;
S206: switching the readout circuit to the low bias linear imaging mode and performing the global strong light protection by the uniformity correction circuit, so that a bias voltage of the pixel array circuit is reduced; and executing the step S201 again;
S207: switching the readout circuit to the Geiger and linear hybrid imaging mode, and performing the local strong light protection by the uniformity correction circuit, so that a bias voltage of each of the sub-array pixel circuits where the saturated pixel unit circuits are located is reduced by a predetermined ratio, and a bias voltage of remaining sub-array pixel circuits is unchanged; and executing the step S201 again.

4. The readout circuit of the single photon avalanche focal plane according to claim 3, wherein a method of identifying the saturated pixel unit circuits in the pixel unit circuits comprises:
counting a quantity of response frames of each of the pixel unit circuits in predetermined frames; calculating a proportion of the response frames; and identifying the pixel unit circuits each having the proportion of the response frames greater than a saturation ratio threshold as the saturated pixel unit circuits.

5. The readout circuit of the single photon avalanche focal plane according to claim 3, wherein the uniformity correction circuit further has a function of strong light damage protection; a workflow of performing the strong light damage protection by the uniformity correction circuit comprises:

S101: powering on a single photon avalanche diode (SPAD) array chip;
S102: detecting whether a temperature rise proportion of the SPAD array chip exceeds a first temperature rise proportion threshold, and if yes, executing a step S103; if no, executing the step S201;
S103: reducing a bias voltage of the SPAD array chip by the uniformity correction circuit, so that the SPAD array chip enters a gain-free working mode;
S104: detecting whether the temperature rise proportion of the SPAD array chip exceeds a second temperature rise proportion threshold, and if yes, executing a step S105; if no, executing the step S102 again;
S105: turning off a power supply of the SPAD array chip;
S106: detecting whether the temperature rise proportion of the SPAD array chip is less than the first temperature rise proportion threshold, and if yes, executing the step S101 again.

6. The readout circuit of the single photon avalanche focal plane according to claim 1, wherein each of the pixel unit circuits comprises an active three-dimensional timing imaging state, a photon counting two-dimensional imaging state, and a non-imaging state.

7. The readout circuit of the single photon avalanche focal plane according to claim 6, wherein the working modes of the readout circuit further comprise an active timing three-dimensional imaging mode, an active counting two-dimensional imaging mode, a passive counting two-dimensional imaging mode, a two-dimensional and three-dimensional hybrid imaging mode, and an interest detection imaging mode.

8. The readout circuit of the single photon avalanche focal plane according to claim 7, wherein each of the pixel unit circuits comprises an interface bias circuit, an overvoltage protection diode, a dead time control circuit, a two-to-one switch, a pixel working mode control circuit, a time-to-digital conversion circuit, a event-frequency-to-digital conversion circuit, a pixel position data circuit, a pixel storage circuit, and a readout control circuit;
wherein each of the photosensitive elements is an SPAD;
the interface bias circuit thereof is configured to provide a bias voltage for the SPAD thereof;
the overvoltage protection diode thereof is configured to limit a maximum voltage at a joint of the SPAD and the interface bias circuit thereof;
the dead time control circuit thereof is configured to control a time interval between two photon events received by the interface bias circuit thereof;
the two-to-one switch thereof is configured to connect the interface bias circuit thereof to the time-to-digital conversion circuit thereof or the event-frequency-to-digital conversion circuit thereof;
the pixel working mode control circuit thereof is configured to control the two-to-one switch according to a state of a corresponding pixel unit circuit; when the interface bias circuit thereof is communicated with the time-to-digital conversion circuit thereof, the corresponding pixel unit circuit is in the active three-dimensional timing imaging state; when the interface bias circuit thereof is communicated with the event-frequency-to-digital conversion circuit thereof, the corresponding pixel unit circuit is in the photon counting two-dimensional imaging state; when the interface bias circuit thereof is disconnected from the time-to-digital conversion circuit thereof and the event-frequency-to-digital conversion circuit thereof, the corresponding pixel unit circuit is in the non-imaging state;

the time-to-digital conversion circuit thereof is configured to measure a photon flight time to realize three-dimensional imaging;

the event-frequency-to-digital conversion circuit thereof is configured to count received photon events to realize two-dimensional imaging;

the pixel position data circuit thereof is configured to generate position information of the corresponding pixel unit circuit and output the position information to the pixel storage circuit thereof;

the pixel storage circuit thereof is configured to store information output by the time-to-digital conversion circuit thereof, the event-frequency-to-digital conversion circuit thereof and the pixel position data circuit thereof; and the readout control circuit is configured to control readout of the information stored in the pixel storage circuit thereof.

9. The readout circuit of the single photon avalanche focal plane according to claim 8, wherein each interface bias circuit is connected with a negative supply voltage VDD− and a positive power supply voltage VDD+.

\* \* \* \* \*